United States Patent [19]

Rohosky et al.

[11] Patent Number: 4,699,753

[45] Date of Patent: Oct. 13, 1987

[54] REACTOR REFUELING MACHINE SIMULATOR

[75] Inventors: Thomas L. Rohosky, West Mifflin; Kenneth J. Swidwa, N. Versailles, both of Pa.

[73] Assignee: Westinghouse Electric Corp., Pittsburgh, Pa.

[21] Appl. No.: 845,303

[22] Filed: Mar. 27, 1986

[51] Int. Cl.⁴ ............................................. G21C 19/00
[52] U.S. Cl. .................................... 376/268; 376/259; 376/463; 364/578; 434/218
[58] Field of Search ............... 376/259, 258, 245, 268, 376/261, 260, 271, 463, 217; 364/578, 478; 434/218

[56] References Cited

U.S. PATENT DOCUMENTS

| | | | |
|---|---|---|---|
| 3,903,403 | 9/1975 | Ferguson et al. | 376/217 |
| 4,149,235 | 4/1979 | Froyd et al. | 364/578 |
| 4,300,205 | 11/1981 | Tansuwan | 364/578 |
| 4,311,557 | 1/1982 | Kowalski et al. | 376/271 |
| 4,383,827 | 5/1983 | Foerst | 364/578 |
| 4,427,623 | 1/1984 | Howard et al. | 376/258 |
| 4,487,741 | 12/1984 | Vuckovich et al. | 376/245 |
| 4,511,531 | 4/1985 | Swidwa et al. | 376/271 |
| 4,604,718 | 8/1986 | Norman et al. | 364/578 |

Primary Examiner—Deborah L. Kyle
Assistant Examiner—Daniel Wasil
Attorney, Agent, or Firm—Daniel C. Abeles

[57] ABSTRACT

The responses of a nuclear reactor refueling machine to commands from a detachable control console are simulated to allow operation of the console for testing and operator training with the console removed from the machine. A simulator, which is connected to the console by the same input and output leads which normally connect the console to the refueling machine, includes a single pulse generator driven by a single three phase A-C motor to simulate movement of the refueling machine bridge, trolley and hoist. The motor drive signals generated on separate console output leads are all connected to the single simulator motor, while the brake release signals energize relays which switch the pulse signals generated by the single pulse generator to the console input leads corresponding to the selected refueling machine component drive motor. The portable simulator also contains relays which simulate engagement and disengagement of fuel assembly and control rod cluster grippers and a device for coupling portions of the refueling machine mast to the hoist. In addition, a number of circuits are provided for testing various control console functions.

6 Claims, 3 Drawing Figures

REACTOR REFUELING MACHINE SIMULATOR

CROSS-REFERENCE TO RELATED APPLICATION

Commonly owned U.S. patent application Ser. No. 382,269 filed May 26, 1982 in the names of John Kaufmann, Kenneth J. Swida and Leonard P. Hornak and entitled "Refueling of Nuclear Reactor".

BACKGROUND OF THE INVENTION

1. Field of the Invention

This invention relates to a simulator which is used in combination with a detachable control unit for a nuclear reactor refueling machine to simulate inputs to the control unit without it actually being installed on the machine, and is useful for operator training and testing.

2. Prior Art

A reactor refueling machine is a device used to remove and replace, or rearrange, fuel assemblies and other components in the core of a shutdown nuclear reactor. Typically such a machine comprises a bridge which moves reciprocally on horizontal tracks straddling the water filled pit in which the reactor vessel is housed. A trolley is mounted on the bridge for reciprocal horizontal movement along the bridge so that by appropriate movement of the bridge and trolley, a mast assembly mounted vertically on the trolley can be positioned over any desired location in the pit. The mast assembly includes an inner mast telescopically mounted inside a fixed mast. A hoist mounted on the trolley raises and lowers the inner mast which carries on its lower end grippers for engaging and lifting fuel assemblies. When a fuel assembly has been lifted clear of the reactor vessel by the hoist, the bridge and trolley are repositioned to locate the fuel assembly over a new location in the core, or to move the fuel assembly to a storage area in the pit or to a transfer system which removes the fuel assembly from the pit. New fuel assemblies supplied through the transfer system are inserted in the core by reverse operation of the refueling machine.

Some of the newer refueling machines also have mechanisms for transferring separately from the fuel assemblies other reactor components, such as fuel rod clusters and control rod thimble plugs. An example of such a machine is described in U.S. Pat. No. 4,511,531. In this machine, a rod telescoped inside the inner mast carries grippers adapted to engage these other reactor components. The hoist is connected to this rod, which in turn is selectively coupled to the inner mast by lugs on the rod which engage a pivotable stop plate on the inner mast. With the stop plate raised, the inner mast is raised and lowered with the rod for servicing fuel assemblies. With the stop plate lowered, the rod moves independently of the inner mast for servicing the other reactor components.

The bridge, trolley and hoist of a refueling machine are positioned independently by separate motors. These motors are controlled by an operator from a control console mounted on the trolley. Signal generators generate feedback signals indicative of movement of each of these components in response to operation of the respective motors. The control console uses these signals in a control loop to accurately position these components and to generate indications to the operator of their respective locations. In the refueling machine disclosed in the above cross-referenced application, the feedback signal generators produce pulses representative of incremental movement of the respective components. The control console includes a programmed digital computer which counts the pulses to track movement and generate a visual display of component position on a cathode ray tube.

The earlier control consoles for reactor refueling machines utilized relay logic which is relatively immune to the harsh conditions inside containment, and therefore these units were left in place on the trolley during operation of the reactor. The digital computer and its associated interfaces are less tolerant of the high temperature, humidity and radiation levels found within containment during reactor operation. Since the refueling machine has no function during reactor operation, it has become the practice to remove the control console from containment during plant operation and to place it in storage until the next refueling cycle.

SUMMARY OF THE INVENTION

It has been recognized by us, that since the detachable refueling machine control console is accessible and available during plant operation it would be desirable to test it and use it for operator training at that time, rather than during a refueling operation when there are competing demands for access to the reactor and any extension of down time is very costly. Accordingly, we have developed a simulator that can be used with the detachable control console to simulate the signals that would be generated by the refueling machine. All commands to the control console actually send signals to the simulator which responds to them as a refueling machine would and feeds responses back to the console.

The invention embraces a combination which includes a detachable refueling machine control console which generates, one at a time, motor signals for the drive motors of a plurality of refueling machine components, and in particular the bridge, trolley, and hoist motors. Separate output leads from the control console apply each of the motor signals to the simulator. The simulator includes only one simulator motor which is connected to the output leads from the control console such that it is driven when any of the motor signals is generated. The simulator also includes only one feedback signal generator which is connected to the simulator motor and generates a simulator feedback signal representative of rotation of the simulator motor. The control console also includes a separate input lead for receiving a feedback signal associated with each of the drive motors. These input leads are also connected to the simulator. Switching means within the simulator, which is responsive to the motor drive signals received from the control console over the output leads, connects the single pulse generator to the console input lead associated with the motor drive signal received from the control console. Thus, the single motor and pulse generator in the simulator selectively simulate each of the refueling machine drive motors in response to the particular drive motor signal generated by the control console, and send back a feedback signal representative of operation of that motor over the appropriate dedicated console input lead.

The motor signals generated by the control console include a motor drive signal and a control signal for each motor and separate output leads are provided for each signal. All of the motor drive signals are connected to the single simulator motor while the control signals are connected to the switching means to route the feedback signal to the appropriate console input lead. The separate control signals generated by the console are brake signals which are used to release the brake on the appropriate motor on the refueling machine. In the preferred embodiment of the invention, the one simulator motor is provided with a brake and all of the brake signals are applied to it so that the brake is released when any of these signals is generated. The brake signals are also connected to the switching means to effect routing of the feedback signal to the proper console input lead.

The invention also embraces the simulator as described which is designed to be used in combination with a detachable control console.

The invention permits the operation of the detachable refueling machine control console to be verified without being installed on the refueling machine, which minimizes the potential for critical path down time problems. It is also useful for training operators without requiring any reactor down time.

While the invention is primarily intended for use while the control console is physically removed from the refueling machine and from containment, it can also be connected to the console when the latter is on the machine to assist in identifying the source of electrical problems during refueling operations.

BRIEF DESCRIPTION OF THE DRAWINGS

A full understanding of the invention can be gained from the following description when read in conjunction with the accompanying drawings in which.

DESCRIPTION OF THE PREFERRED EMBODIMENTS

Figure 1:
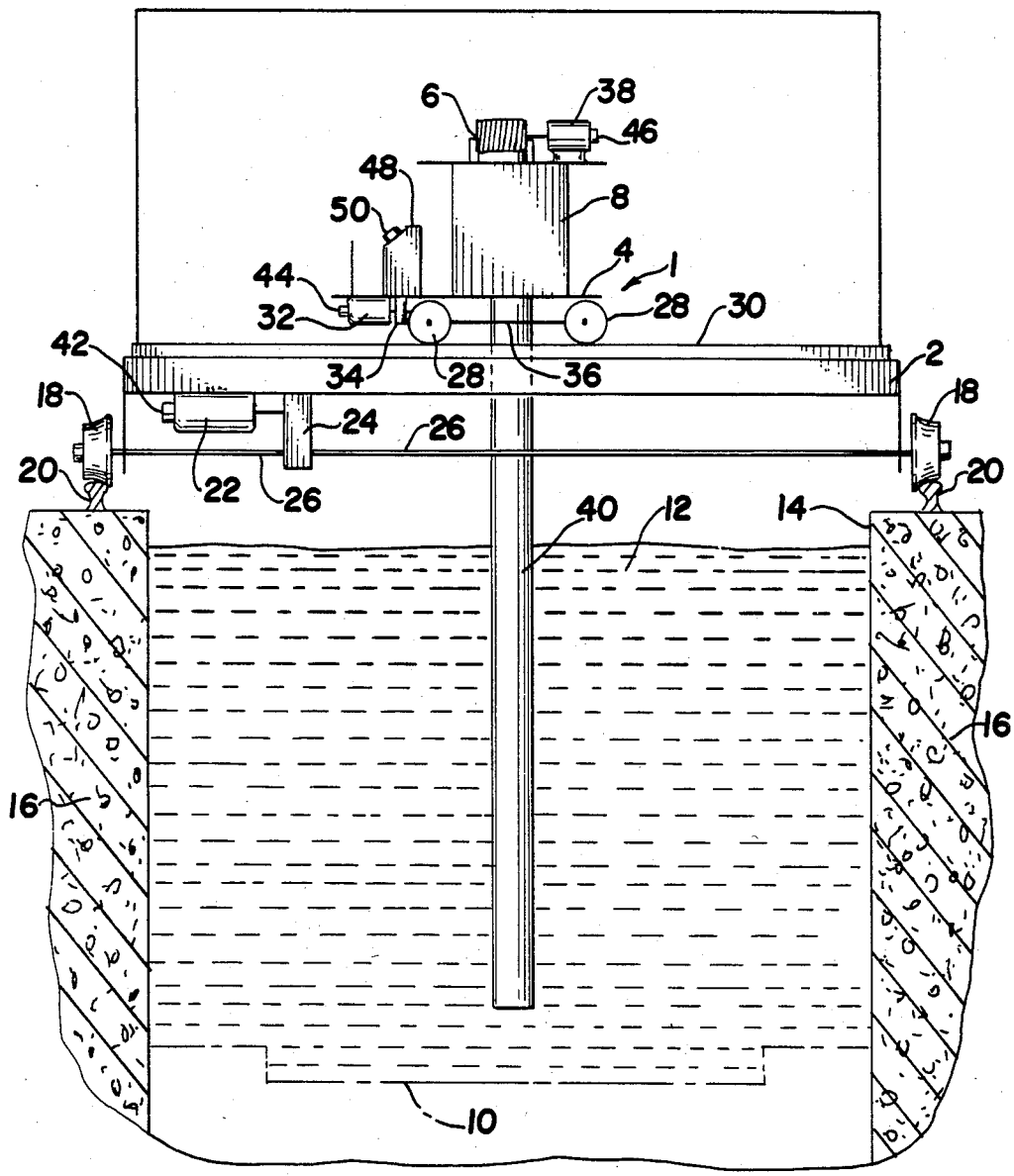
FIG. 1 is a schematic representation of a refueling machine to which the invention is applied, positioned over a nuclear reactor.

The invention will be described in connection with the detachable control console of the nuclear reactor refueling machine described in U.S. Pat. No. 4,511,531 which is hereby incorporated by reference into this application to provide a complete description of such a machine and its operation, but which is not required for a full understanding of the present invention. A schematic representation of such a refueling machine 1 is shown in FIG. 1. The machine 1 includes a bridge 2, a trolley 4 and a hoist 6 supported on a mast 8. It straddles a reactor 10 which is located under 20 to 30 feet of water 12 at the bottom of a pit 14 in a containment defined by massive walls 16. The bridge 2 is mounted on wheels 18 which ride on rails 20 extending along the sides of the pit 14 on the walls 16. The wheels 18 are driven by a bridge motor 22 through a gear reducer 24 and drive shafts 26. Similarly, the trolley 4 is mounted on wheels 28 for movement on rails 30 extending longitudinally along the bridge 2. A trolley motor 32 drives the wheels 28 through a gear reducer 34 and drive shaft 36. The hoist 6 is driven by hoist motor 38 to raise and lower an elongated tube and an inner mast (neither shown) inside a guide mast 40. The details of the elongated tube and the inner mast which are positioned by the hoist 6 are described in U.S. Pat. No. 4,511,531. The bridge, trolley, and hoist motors, 22, 32 and 38 are equipped with pulse generators 42, 44 and 46 respectively which generate pulse feedback signals representative of incremental rotation of the motor, and hence of movement of the associated refueling machine component The control console 48, which is mounted on the trolley 4 during refueling operations, responds to operator inputs and feedback from the refueling machine, such as the feedback signals from the pulse generators 42, 44, and 46, to generate various control signals for the operation of the refueling machine. A CRT 50 on the console provides the operator with a visual display of pertinent refueling machine parameters.

Figure 2:
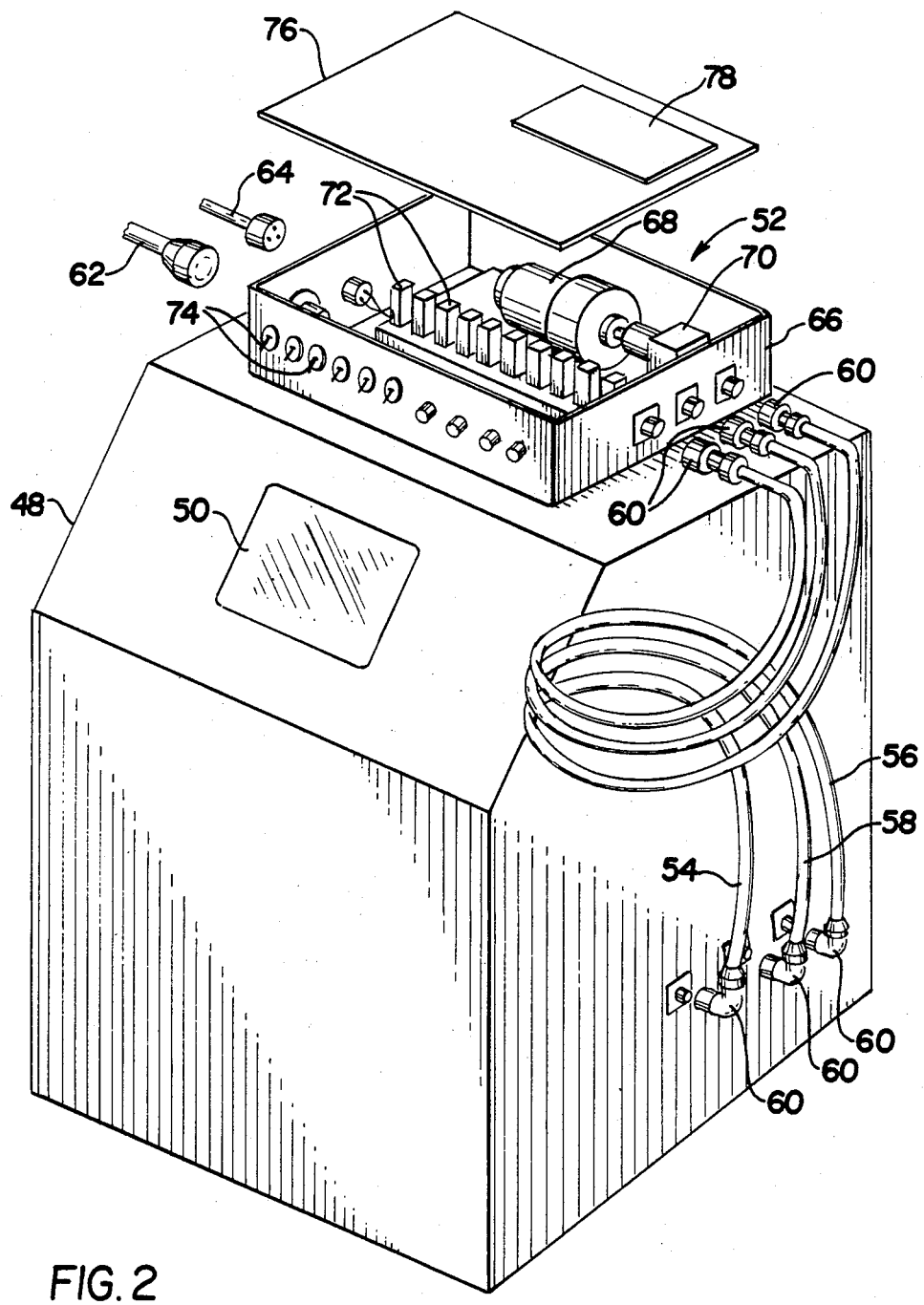
FIG. 2 is an isometric view of the simulator of the invention with the lid raised illustrating its connection to a refueling machine control console.

The control console 48 is removed from the refueling machine during operation of the reactor at power to protect the solid state electronic equipment in the console from the high levels of radiation, temperature, and humdity present in containment. As shown in FIG. 2, a refueling machine simulator 52 is connected to the detached control console 48 by a group of cables 54, 56, and 58 having quick disconnects 60 at each end. These cables replace the cables by which the control console is connected to the refueling machine 1 during refueling operations. Power cords 62 and 64 provide 220 volt three phase and 115 VAC power respectively to the simulator 52, which it will be seen, supplies these services to the control console through cable 54.

The simulator 52 includes a steel enclosure 66 which houses a single three phase simulator motor 68 which drives a single rotary pulse generator 90. The simulator 52 also includes a number of relays 72, the functions of which will be discussed in detail below, and associated circuitry (not shown in FIG. 2). Switches 74 on the front of the simulator 52 control various test modes of the simulator. A removable lid 76 on the enclosure 66 is provided with a clear LEXAN window 78 for ease in viewing the moving parts. The simulator 52 is a compact self-contained unit which fits easily in a small suitcase for transportation and storage.

Figure 3:
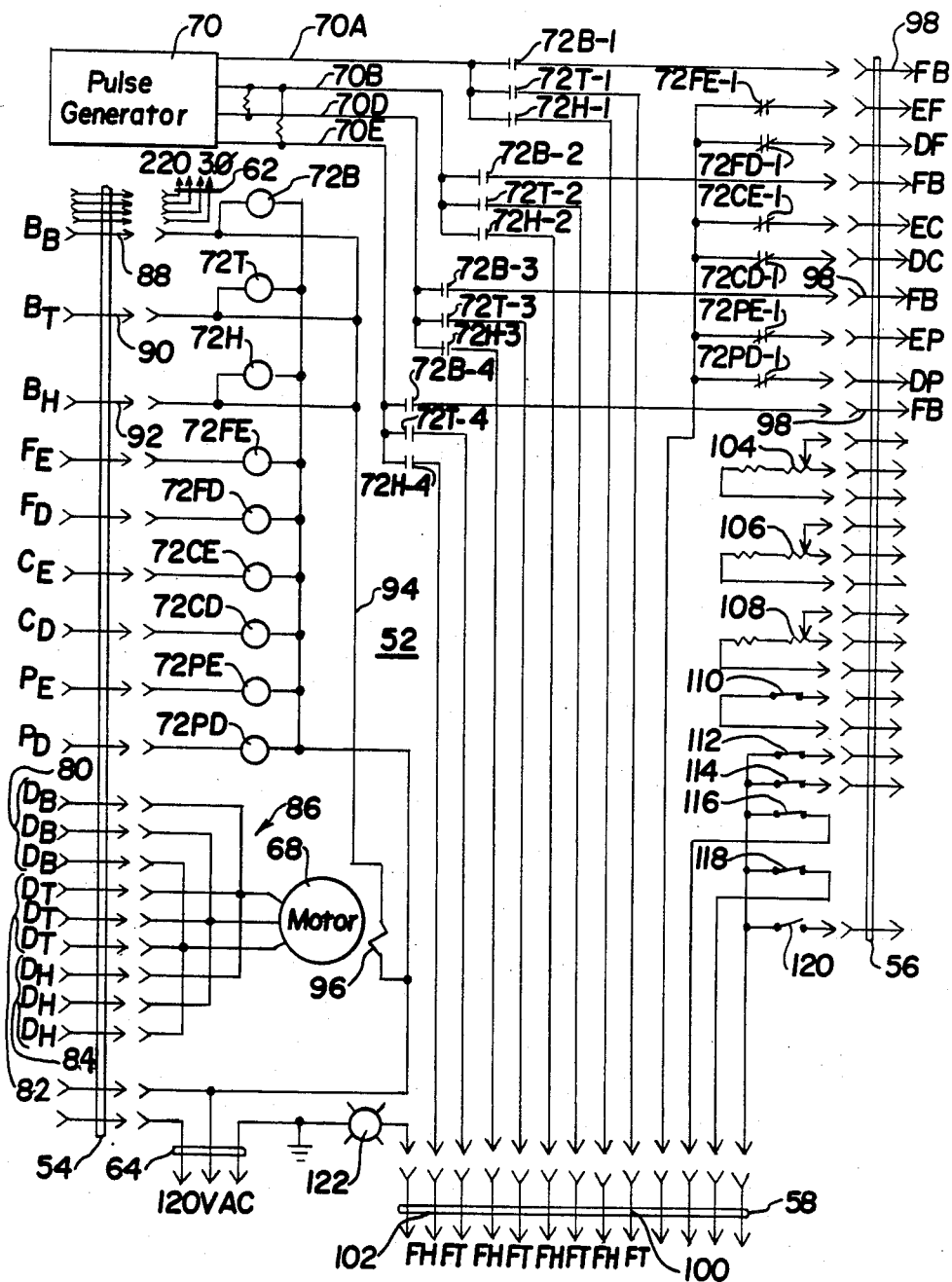
FIG. 3 is a schematic circuit diagram of the simulator of FIG. 1 and the connection between it and the control console.

As shown in the schematic circuit diagram of FIG. 3, three phase power applied to the simulator 52 through power cord 62 is supplied to the control console 48 by four leads of cable 54. The 120 VAC power received through power cord 64 is used to power a number of relays 72 in the simulator 52 and is also supplied to the control console through leads in cable 54. The 120 VAC is used by the control consoles to power its controls and logic circuits while the 220 volt three phase power is used to power a variable frequency, pulse width modulated motor controller. Logic circuits within the control console respond to operator inputs to control the motor controller and to connect the three phase drive signals $D_B$, $D_T$ or $D_H$ generated by the motor controller to one of three sets of output leads 80, 82, 84 in cable 54 for powering the bridge, trolley or hoist motors 22, 32 or 38 respectively on the refueling machine 1. However, all of these drive signals are connected through a network 86 within the simulator to the single simulator motor 68.

The logic circuits of the control console 48 also generate brake or control signals $B_B$, $B_T$ or $B_H$ for the bridge, trolley or hoist motor respectively on the refueling machine, as appropriate, simultaneously with the selected drive signals. These signals are connected through separate leads 88, 90, and 92 in cable 54 to the coil of a bridge brake relay 72B, a trolley brake relay 72T, and a hoist brake relay 72H respectively in the simulator 52 to energize the same. Each of these brake or control signals is also connected through a lead 94 to the coil of an electrically releasable brake 96 on the signal simulator motor 68. Thus, generation of any of the brake signals releases the brake on the single simulator motor, but energizes only the designated relay coil.

Each of the relays 72B, H and T has four sets of make contacts, 72B-1 to 4, 72T-1 to 4 and 72H-1 to 4, with one contact from each relay connected in parallel in one of four leads, 70A, B, D and E carrying the output signals generated by the single rotary pulse generator 70. The pulse generator 70 generates pulse signals on the leads 70A, B, D and E at a rate and in a pattern determined by the direction and rate of rotation of the single simulator motor 68. These respective signals are transmitted back to the control console 48 as feedback signals. When the contacts 72B-1 to 4 of the bridge relay 72B are closed, the pulse signals are routed back to the control console 48 as feedback signals FB through console input leads 98 in cable 56. These are the same leads over which the control console 48 receives pulse signals from the pulse generator 42 associated with the bridge motor 22 when the console is connected to the refueling machine 1. Similarly, with the contacts 72T-1 to 4 closed the pulse signals are directed to the console as trolley motor feedback signals FT over leads 100 in cable 58, and with contacts 72H-1 to 4 closed, as hoist motor feedback signals FH over leads 102 in cable 58.

As mentioned, the refueling machine of U.S. Pat. No. 4,511,531 includes an inner mast which has grippers on the lower end for grasping fuel assemblies so that they may be lifted out of the reactor core and transported about in containment. The grippers are actuated by pneumatic cylinders which are controlled by solenoid valves. When the gripper is to engage a fuel assembly, the control console sends a fuel assembly gripper engage signal FE over an output lead in cable 54 to a fuel assembly gripper engage solenoid. When the gripper moves to the engage position, a limit switch is closed to generate a feedback signal EF which is sent back to the console on an input lead in cable 56. When the fuel assembly is to be disengaged, a fuel assembly gripper disengage signal FD is sent to a disengage solenoid which results in generation of a fuel assembly gripper disengage signal DF when the corresponding limit switch is closed.

The machine of U.S. Pat. No. 4,511,531 includes a second set of grippers which is mounted on a tube which telescopes into the mast. This set of grippers, which is also pneumatically actuated, is designed for gripping other reactor components such as control rod clusters. The pneumatic cylinder is actuated to the engage position by a solenoid in response to a control road cluster engage signal, CE, which generates an engage signal EC when the corresponding limit switch is closed. Likewise, a control rod cluster disengage signal CD energizes the disengage solenoid which produces a disengage signal DC as the limit switch closes.

The tube carrying the control rod cluster grippers in U.S. Pat. No. 4,511,531 is raised and lowered by the hoist 6. A pivotable stop plate on the inner mast carrying the fuel assembly grippers is actuated to a position wherein lugs on the tube engage the stop plate to lift the inner mast when a plate engage solenoid is energized by a plate engage signal PE from the control console to actuate a pneumatic cylinder. The stop plate is pivoted to a position where the plate is clear of the lug so that the inner mast is not lifted with the inner tube when a disengage solenoid is energized by a disengage signal PD. Limit switches generate corresponding engage and disengage signals EP and DP when the stop plate reaches the respective positions.

When the simulator 52 is connected to the control console, the FE and FD signals carried by leads in cable 54, energize the coils of fuel assembly gripper engage and disengage relays 72FE and 72FD respectively. Similarly, the signals CE and CD, associated with the control rod grippers, and PE and PD, associated with the stop plate, energize the coils 72CE, 72CD, 72PE and 72PD in the simulator 52 respectively. A set of break contracts associate with each of these relays, such as 72FE-1, completes a circuit between leads in the cables 56 and 58 connected to the console to generate the respective feedback signals set forth above.

The refueling machine is provided with a pair of load-cells which have an electrical resistance which is proportional to the load on the hoist. The signals generated by these load cells provide an indication of whether the weight of the fuel assembly or control rod cluster is supported by the hoist and whether there is any obstruction to free movement of the supported component. These load cells are simulated by potentiometers 104 and 106 which are connected to the control console through leads in cable 56. The potentiometers can be set to simulate a load condition for testing this feature of the control console. Another potentiometer 108 is provided to simulate the pneumatic system pressure transducer and thereby test the console's reading of the transducer output.

Several switches provide means for checking certain functions of the control console 1. Switch 110 tests the console's response to a geared limit switch which protects against overtravel of the hoist. Switch 112 simulates a hoist motor overheat condition. Switch 114 indicates whether the mast has rotated out of its normal position. Since the positions of the bridge, hoist and trolley are determined by counting pulses indicative of incremental movement, check switches 116, 118 and 120 are mounted at a known location in the path of each of these components to provide a means for checking the calculated positions and to reset them if they are out of synchronization.

The refueling machine can transport fuel assemblies to and from a transfer area where they can be removed from or introduced into containment by a transfer system. An interlock system prevents interference between the refueling machine and the transfer system. A lamp 122 on the simulator checks the generation of the interlock signal by the control console 48.

In operation, the simulator is connected to the control console 48 by cables 54, 56 and 58 and power cords 62 and 64 are connected to a power source. When used as a simulator, the operator operates the controls of the console to produce the desired simulated refueling machine movement. For instance, if movement of the bridge is to be simulated, the proper console controls are actuated to generate a bridge brake signal, $B_B$ on output lead 88 in cable 54. This energizes the simulator motor brake coil 96 through lead 94 to release the brake. It also energizes the coil of relay 72B to close the contacts 72B-1 to 4. The control console also connects the motor controller to output leads 80 in cable 54 associated with the bridge motor and controls the phase and width of pulses generated by the controller to produce a three phase signal, $D_B$, which is connected through network 86 to the single simulator motor 68. As the motor begins to turn in the direction and at the rate dictated by the signal $D_B$, the pulse generator 70 generates a pattern of pulses on the leads 70A, B, D and E porportional to this movement. This pulse signal is fed back to the console 48 as feedback signal FB on the console input leads 98 in cable 56. The console 48 tracks movement of the bridge by counting the pulses in the signal FB and displays bridge position on the CRT display 50.

When movement of the trolley is commanded, the console generates the signal $B_T$ on output lead 90 in cable 54 to release the simulator motor brake by energizing coil 96. The signal $B_T$ also energizes coil 72T to direct pulses generated by pulse generator 70 through contacts 72T-1 to 4 to console input leads 100 as feedback signals FT. Movement of the trolley simulated by the motor 68 and pulse generator 70, and represented by the feedback signal FT, is followed by the console and also presented on the CRT display 50.

When hoist movement is desired, the operator actuates the console controls to generate a hoist brake signal $B_H$ which is applied to the simulator through lead 92 of cable 54 to energize the coil 96 of the simulator motor brake and the coil of relay 72H. Make contacts 72H-1 to 4 of relay 72H direct the pulses from pulse generator 70 to input leads 102 in cable 58 for transmission to the console as the hoist motor feedback signal FH. Movement of the hoist is also tracked by the console and displayed on the CRT 50.

Thus, it can be seen that a single simulator motor 68 and pulse generator 70 simulate all three refueling machine motors. The separate leads which direct the three phase drive signals to the three separate refueling machine motors are all connected to operate the one simulator motor. In addition, the brake signals for each of the refueling machine motors which are each carried by a separate lead are also connected to energize the one brake coil for the single simulator motor. Whereas, in the refueling machine, these signals only release the appropriate brake; in the simulator they each energize a separate relay which closes contacts to direct the pulses generated by the single pulse generator to the appropriate separate console input line associated with the indicated refueling machine motor.

When the operator provides an input to the console 48 for the grippers to engage a fuel assembly or a control rod cluster, a signal generated by the console energizes the appropriate relay 72FE or 72CE which opens its normally closed contacts 72FE-1 or 72CE-1 to simulate the engagement. When the gripper is to release the fuel assembly or control rod cluster, the console generates a disengage signal which energizes relay 72FD or 72CD to open its normally closed contacts and provide an indication of the disengagement. When a fuel assembly is to be lifted, the console generates a stop plate engage signal, PE, which energizes relay 72PE to generate an indication by opening contacts 72PE-1 of the stop plate being pivoted into position to couple the inner mast carrying the fuel assembly grippers to the tube lifted by the hoist. When the console generates a disengage stop plate signal, PD, the contacts of relay 72PD open to simulate pivoting of the stop plate to a position where the inner mast is disengaged from the tube connected to the hoist.

The remaining features of the simulator are used during testing of the console. The load cell potentiometers and the pressure transducer potentiometer can be used to test the console load and pressure measurements. The various switches can be actuated to verify the response by the control console to the test conditions. The simulator of this invention may be used to troubleshoot the console when it is installed on the refueling machine as well as when the console has been removed from containment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In combination:
   a control console detachable from a nuclear reactor refueling machine, said control console including means for generating selectively one at a time a plurality of separate motor signals for effecting movement of a plurality of refueling machine components, for processing a plurality of separate feedback signals indicative of movement of each of said refueling machine components, and for generating an indication of the position of said plurality of components in response to said feedback signals,
   separate output lead means connected to said control console for each of said plurality of motor signals,
   separate input lead means connected to said control console for each of said plurality of feedback signals, and
   a refueling machine simulator unit comprising:
   a single simulator motor,
   a single feedback generator connected to said motor for generating a simulator motor feedback signal indicative of rotation of said simulator motor,
   means connecting said control console output leads to apply motor signals for all of said plurality of components to said simulator motor, and
   switching means connected to the output leads and responsive to the plurality of motor signals for selectively connecting the single feedback generator to the input lead associated with the motor signal currently being generated by the control console to route the simulator motor feedback signal back to the control console.

2. The combination of claim 1 wherein said plurality of motor signals generated by said control console each include a drive signal and a control signal, wherein said output lead means for the motor signal include drive signal leads to which the drive signals are applied and control signal leads to which the control signals are applied, wherein said connecting means include means for connecting all of the drive signal leads to the simulator drive motor, and wherein said switching means include means connected to said control signal leads in a pattern which effects connection of the signal feedback generator to the input lead associated with the control signal being generated.

3. The combination of claim 2 wherein said simulator motor includes brake means and means connecting said brake means to all of said control signal output leads such that the simulator motor brake means is released in response to the generation of any of said control signals.

4. A portable simulator unit for use with a detachable nuclear reactor refueling machine control console having means for generating selectively, one at a time, a pair of bridge motor signals including a bridge motor drive signal and a bridge motor control signal, a pair of trolley motor signals including a trolley motor drive signal and a trolley motor control signal, and a pair of hoist motor signals including a hoist motor drive signal and a hoist motor control signal, said control console having a separate output lead for each motor signal and a separate input lead for each of a bridge feedback signal, a trolley feedback signal and a hoist feedback signal, said portable simulator comprising:

a single simulator motor for use in simulating a bridge motor, a trolley motor, and a hoist motor;
  a single simulator feedback signal generator connected to said simulator motor for generating a simulator feedback signal in response to operation of said simulator motor,
  means for connecting each of the control console output leads carrying a motor drive signal to the sigle simulator motor to drive the same; and
  switching means adapted to be connected to each of the control console output leads for the bridge, trolley, and hoist motor control signals and to said single simulator feedback signal generator and responsive to motor control signals generated on the output leads for switching the feedback signal generated by the single simulator feedback signal generator to the one of the input leads for the bridge feedback signal, the trolley feedback signal, and the hoist feedback signal corresponding to the input lead on which a motor control signal is being generated by the control console.

5. The portable simulator unit of claim 4 wherein said motor control signals are brake control signals, said unit further including a brake for said single simulator motor and means connecting each of the control console output leads carrying a brake control signal to the simulator motor brake to operate the same.

6. In combination:
  a nuclear reactor;
  a refueling machine having a bridge, trolley and hoist each driven by a separate motor having feedback means for generating a feedback signal indicative of movement thereof, said motors being operable to position the refueling machine over the nuclear reactor for refueling the same, said refueling machine also having a removable control console including means for selectively generating separate motor signals for operating said bridge, trolley and hoist motors and for processing said feedback signals to generate an indication of the positions thereof, separate output leads connecting each of said motor signals to the respective refueling machine motor, and separate input leads for connecting each of the feedback means to the console; and
  a portable simulator unit comprising:
    a single simulator motor;
    a single simulator feedback signal generator connected to said simulator motor for generating a simulator feedback signal in response to operation of said simulator motor;
    means for selectively connecting said output leads of said console to said simulator unit in place of said refueling machine motors, and for connecting the console input leads to the simulator unit in place of the refueling machine motor feedback means; and
    means for driving said single simulator motor in response to any of said bridge, trolley or hoist motor signals generated by the console and means for applying the simulator feedback signal to the console input lead associated with the motor signal being generated by the control console.

* * * * *